(12) United States Patent
Nogueyra

(10) Patent No.: US 10,169,631 B2
(45) Date of Patent: Jan. 1, 2019

(54) RECOGNIZING FINGERPRINTS AND FINGERPRINT COMBINATIONS AS INPUTS

(71) Applicant: International Business Machines Corporation, Armonk, NY (US)

(72) Inventor: Sebastian Nogueyra, Neuquen (AR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 40 days.

(21) Appl. No.: 15/450,441

(22) Filed: Mar. 6, 2017

(65) Prior Publication Data

US 2018/0253583 A1 Sep. 6, 2018

(51) Int. Cl.
*G06K 9/00* (2006.01)
*G06F 3/041* (2006.01)

(52) U.S. Cl.
CPC ......... *G06K 9/00013* (2013.01); *G06K 9/001* (2013.01); *G06F 3/041* (2013.01)

(58) Field of Classification Search
USPC .......................................................... 382/125
See application file for complete search history.

(56) References Cited

U.S. PATENT DOCUMENTS

| 7,697,729 | B2 | 4/2010 | Howell et al. | |
|---|---|---|---|---|
| 8,279,182 | B2 | 10/2012 | Kim et al. | |
| 2003/0029913 | A1* | 2/2003 | Tsukamoto | G06K 9/00006 235/382 |
| 2005/0051627 | A1* | 3/2005 | Matushima | G06K 7/10881 235/454 |
| 2011/0300829 | A1 | 12/2011 | Nurmi et al. | |
| 2012/0044156 | A1 | 2/2012 | Michaelis et al. | |

(Continued)

FOREIGN PATENT DOCUMENTS

| WO | 2007042918 A2 | 4/2007 |
|---|---|---|
| WO | 2011078887 A1 | 6/2011 |
| WO | 2015162203 A1 | 10/2015 |

OTHER PUBLICATIONS

"Portable Biometric Scanner for Four-Finger Fingerprint Scanning", IP.Com No. IPCOM000169557D, Apr. 21, 2008.

(Continued)

*Primary Examiner* — Jerome Grant, II
(74) *Attorney, Agent, or Firm* — Law Offices of Ira. D. Blecker, P.C.

(57) ABSTRACT

A method of inputting an action to a computer device using a fingerprint recognition sensor placed on a thumb of a user. The method including: setting a plurality of actions corresponding to fingerprint data from a user's fingerprint patterns; storing the plurality of actions corresponding to the fingerprint data in the computer device; reading fingerprint data by the fingerprint recognition sensor corresponding to the user's fingerprint patterns from a first finger placed in contact with the fingerprint recognition sensor; comparing the fingerprint pattern from the first finger with the user's fingerprint data stored in the computer device; and responsive to a match between the fingerprint pattern from the first finger and the user's fingerprint data stored in the computer device, initiating the action stored in the computer device corresponding to the first finger placed in contact with the fingerprint recognition sensor.

18 Claims, 6 Drawing Sheets

(56) References Cited

U.S. PATENT DOCUMENTS

| | | | |
|---|---|---|---|
| 2012/0188189 A1* | 7/2012 | Deluca | G06F 3/041 345/173 |
| 2012/0321149 A1 | 12/2012 | Carver et al. | |
| 2016/0100788 A1* | 4/2016 | Sano | A61B 5/6898 600/595 |
| 2016/0125179 A1* | 5/2016 | Bouatou | G07C 9/00087 340/5.82 |
| 2018/0092802 A1* | 4/2018 | Giacometti | A61H 31/005 |
| 2018/0101716 A1* | 4/2018 | Subbarao | G06K 9/00013 |

OTHER PUBLICATIONS

"Use of Photo Copier or Multifunction Product As a Biometric Fingerprint Scanner for Identification and Authorization Purposes", IP.Com No. IPCOMM000144015D, Dec. 14, 2006.

Narishige Abe et al., "A Novel Hand-Type Detection Technique with Fingerprint Sensor", Proc. SPIE vol. 8712, Biometric and Surveillance Technology for Human and Activity Identification X, May 31, 2013.

* cited by examiner

| RIGHT HAND | |
|---|---|
| THUMB + INDEX FINGER | a |
| THUMB + MIDDLE FINGER | b |
| THUMB + RING FINGER | c |
| THUMB + PINKY FINGER | d |
| THUMB + RING, MIDDLE FINGERS | e |

FIG. 4

| LEFT HAND | |
|---|---|
| THUMB + INDEX FINGER | f |
| THUMB + MIDDLE FINGER | g |
| THUMB + RING FINGER | h |
| THUMB + PINKY FINGER | i |
| THUMB + RING, MIDDLE FINGERS | j |

FIG. 5

| BOTH HANDS | | |
|---|---|---|
| RIGHT HAND | LEFT HAND | |
| THUMB + INDEX FINGER | THUMB + INDEX FINGER | k |
| | THUMB + MIDDLE FINGER | l |
| | THUMB + RING FINGER | m |
| | THUMB + PINKY FINGER | n |
| ▼ | THUMB + RING, MIDDLE FINGERS | o |
| THUMB + MIDDLE FINGER | THUMB + INDEX FINGER | p |
| | THUMB + MIDDLE FINGER | q |
| | THUMB + RING FINGER | r |
| | THUMB + PINKY FINGER | s |
| ▼ | THUMB + RING, MIDDLE FINGERS | t |
| THUMB + RING FINGER | THUMB + INDEX FINGER | u |
| | THUMB + MIDDLE FINGER | v |
| | THUMB + RING FINGER | w |
| | THUMB + PINKY FINGER | x |
| ▼ | THUMB + RING, MIDDLE FINGERS | y |
| THUMB + PINKY FINGER | THUMB + INDEX FINGER | z |
| | THUMB + MIDDLE FINGER | space |
| | THUMB + RING FINGER | delete |
| | THUMB + PINKY FINGER | backspace |
| ▼ | THUMB + RING, MIDDLE FINGERS | home |

FIG. 6

RECOGNIZING FINGERPRINTS AND FINGERPRINT COMBINATIONS AS INPUTS

BACKGROUND

The present exemplary embodiments pertain to methods of inputting actions from a fingerprint sensor and, more particularly, pertain to a thumb fingerprint sensor used in conjunction with other fingers on a user's hand to input actions into a computer device.

Fingerprint sensing and matching is widely used for personal identification or verification. A common approach to fingerprint identification involves scanning a sample fingerprint or an image thereof and storing the image and/or unique characteristics of the fingerprint image. The characteristics of a sample fingerprint may be compared to information for reference fingerprints already stored in a database to determine or verify identification of an individual.

A fingerprint sensor is an electronic device used to capture a digital image of the fingerprint pattern. The captured image is called a live scan. This live scan is digitally processed to create a biometric template (a collection of extracted features) which is stored and used for matching. Many technologies have been used including optical, capacitive, RF, thermal, piezoresistive, ultrasonic, piezoelectric and MEMS.

BRIEF SUMMARY

The various advantages and purposes of the exemplary embodiments as described above and hereafter are achieved by providing, according to an aspect of the exemplary embodiments, a method of inputting an action to a computer device using a fingerprint recognition sensor placed on a thumb of a first hand of a user, the fingerprint sensor having an outer surface to read a fingerprint of a user's finger placed in contact with the fingerprint recognition sensor, comprising: setting a plurality of actions corresponding to fingerprint data from a user's fingerprint patterns; storing the plurality of actions corresponding to the fingerprint data in the computer device; responsive to a first finger of the user placed in contact with the fingerprint recognition sensor, reading fingerprint data by the fingerprint recognition sensor corresponding to the user's fingerprint patterns from the first finger placed in contact with the fingerprint recognition sensor; comparing the fingerprint pattern from the first finger with the user's fingerprint data stored in the computer device; and responsive to a match between the fingerprint pattern from the first finger and the user's fingerprint data stored in the computer device, initiating the action stored in the computer device corresponding to the first finger placed in contact with the fingerprint recognition sensor.

According to another aspect of the exemplary embodiments, there is provided a computer program product for inputting an action to a computer device using a fingerprint recognition sensor placed on a thumb of a first hand of a user, the fingerprint sensor having an outer surface to read a fingerprint of a user's finger placed in contact with the fingerprint recognition sensor, the computer program product comprising a computer readable storage medium having program instructions embodied therewith, the program instructions executable by a computer processor to cause the computer processor to cause the computer processor to perform a method comprising: setting a plurality of actions corresponding to fingerprint data from a user's fingerprint patterns; storing the plurality of actions corresponding to the fingerprint data in the computer device; responsive to a first finger of the user placed in contact with the fingerprint recognition sensor, reading fingerprint data by the fingerprint recognition sensor corresponding to the user's fingerprint patterns from the first finger placed in contact with the fingerprint recognition sensor; comparing the fingerprint pattern from the first finger with the user's fingerprint data stored in the computer device; and responsive to a match between the fingerprint pattern from the first finger and the user's fingerprint data stored in the computer device, initiating the action stored in the computer device corresponding to the first finger placed in contact with the fingerprint recognition sensor.

According to a further aspect of the exemplary embodiments, there is provided a system for recognizing fingerprints and fingerprint combinations as inputs to a computer device comprising: a fingerprint recognition sensor placed on a thumb of a first hand of a user, the fingerprint sensor having an outer surface to read a fingerprint of a user's finger placed in contact with the fingerprint recognition sensor; a nontransitory storage medium that stores instructions; a processor that executes the instructions to: set a plurality of actions corresponding to fingerprint data from a user's fingerprint patterns; store the plurality of actions corresponding to the fingerprint data in the computer device; responsive to a first finger of the user placed in contact with the fingerprint recognition sensor, read fingerprint data by the fingerprint recognition sensor corresponding to the user's fingerprint patterns from the first finger placed in contact with the fingerprint recognition sensor; compare the fingerprint pattern from the first finger with the user's fingerprint data stored in the computer device; and responsive to a match between the fingerprint pattern from the first finger and the user's fingerprint data stored in the computer device, initiate the action stored in the computer device corresponding to the first finger placed in contact with the fingerprint recognition sensor.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 4 is a table of inputs using the fingerprint recognition sensor illustrated in FIG. 2.

FIG. 5 is a table of inputs using the fingerprint recognition sensor illustrated in FIG. 3.

FIG. 6 is a table of inputs using both of the fingerprint recognition sensors illustrated in FIGS. 2 and 3.

DETAILED DESCRIPTION

The analysis of fingerprints for matching purposes generally requires the comparison of several features of the print pattern. These include patterns, which are aggregate characteristics of ridges, and minutiae points, which are unique features found within the patterns.

The three basic patterns of fingerprint ridges are the arch, loop, and whorl. In the arch ridge pattern, the ridges enter from one side of the finger, rise in the center forming an arc, and then exit the other side of the finger. In the loop ridge pattern, the ridges enter from one side of a finger, form a curve, and then exit on that same side. In the whorl ridge pattern, the ridges form circularly around a central point on the finger.

Fingerprint processing has three primary functions: enrollment, searching and verification. In the enrollment function, complete fingerprints are scanned and recorded in data storage. Regarding the verification function, fingerprints are compared to stored fingerprints for verification purposes. There are several techniques to match fingerprints such as correlation-based matching, minutiae-based matching, ridge feature-based matching and minutiae-based algorithm. The minutiae-based matching algorithm is most preferred due to its efficiency and accuracy.

The major minutiae features of fingerprint ridges are ridge ending, bifurcation, and short ridge (or dot). The ridge ending is the point at which a ridge terminates. Bifurcations are points at which a single ridge splits into two ridges. Short ridges (or dots) are ridges which are significantly shorter than the average ridge length on the fingerprint. Minutiae and patterns are very important in the analysis of fingerprints since no two fingers have been shown to be identical.

Figure 1:
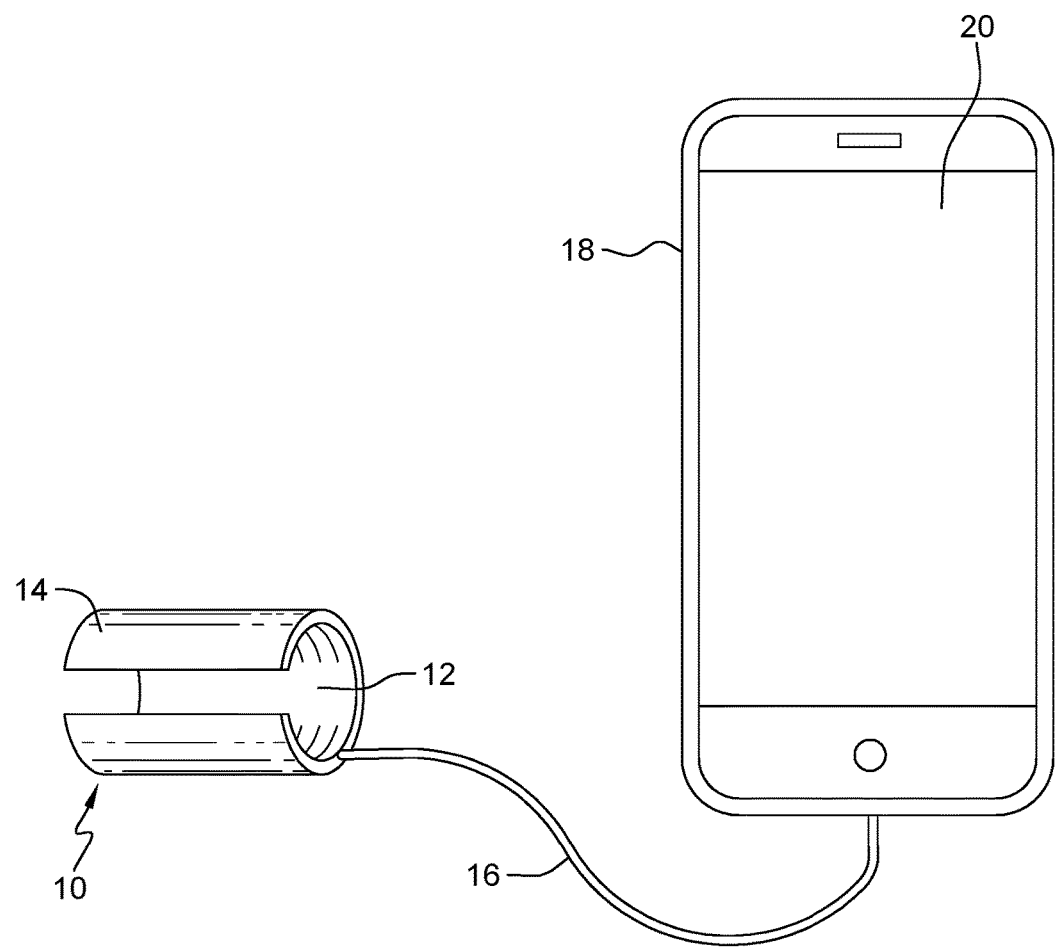
FIG. 1 is an illustration of a fingerprint recognition sensor of the exemplary embodiments connected to a computer device.

Referring to the Figures in more detail, and particularly referring to FIG. 1, there is shown a fingerprint recognition sensor 10 that may be used in the exemplary embodiments. The fingerprint recognition sensor 10 may be tightly curved to fit over the thumb of a user (not shown). The inside 12 of the fingerprint recognition sensor 10 does not read fingerprints. It is the outside 14 of the fingerprint recognition sensor 10 that reads fingerprints of a user's fingers placed in contact with the outside 14 of the fingerprint recognition sensor 10.

In one exemplary embodiment, the fingerprint recognition sensor 10 reads the entire fingerprint pattern of the arch, loop, and whorl ridges. Reading of the entire fingerprint pattern may be desirable if security features tied to the entire fingerprint pattern are to be enabled. In another exemplary embodiment, only the major minutiae features mentioned above may be read which are sufficient to distinguish one finger from another finger. This latter embodiment is most preferred as it will allow fast triggering and option selection as discussed hereafter.

Prior to reading fingerprints, the fingerprint recognition sensor 10 may go through an enrollment process to learn the user's fingerprints which will allow quick verification of the user's fingerprint when the fingerprint recognition sensor 10 is put into practice.

The fingerprint recognition sensor 10 may be made from low-cost organic thin-film transistor (OTFT) technology available from FlexEnable (Cambridge Science Park, UK). The fingerprint recognition sensor 10 may have flexible optical sensors and organic photodiodes that may be used to image fingerprints. The fingerprint recognition sensor 10 may have a thickness of around 0.3 mm (millimeters). NEXT Biometrics (Oslo, Norway) also has developed a flexible fingerprint sensor.

While the above-described fingerprint recognition sensor 10 may be flexible, this is not an absolute requirement. There are different ways of reading fingerprints, including but not limited to image, pressure, capacitance and ultrasonic means. Because only a small portion of the fingerprint may be needed to differentiate each digit, the fingerprint reader may be small in size and not necessarily flexible although being flexible is most preferred. In one exemplary embodiment, the fingerprint recognition sensor 10 may comprise a flexible material that cannot read fingerprints plus a small fingerprint reader (that may not be flexible) embedded in the flexible material. It is most preferred that the fingerprint recognition sensor 10 should be light, thin and comfortable to use.

The fingerprint recognition sensor 10 may be connected by a cable 16 to a computer device 18 such as a smartphone, laptop, desktop computer, GPS device or any other kind of computer device. It is also within the scope of the exemplary embodiments for the fingerprint recognition sensor 10 to be self-powered by a battery (not shown) and, further, to have communication capability such as by Bluetooth short range radio or Wi-Fi.

An advantage of the exemplary embodiments is that the fingerprint recognition sensor 10 is placed on the thumb but does not actually read the thumb fingerprint. Rather, it is the interaction of the fingerprint recognition sensor 10 with the other fingers that cause an input and an action to occur. That is, the fingers opposite the thumb make contact with the fingerprint recognition sensor 10 and after making contact with the fingerprint recognition sensor 10, the fingerprint of the opposing finger or fingers are imaged and read and then according to prestored settings, an action may occur and an image may be displayed.

Figure 2:
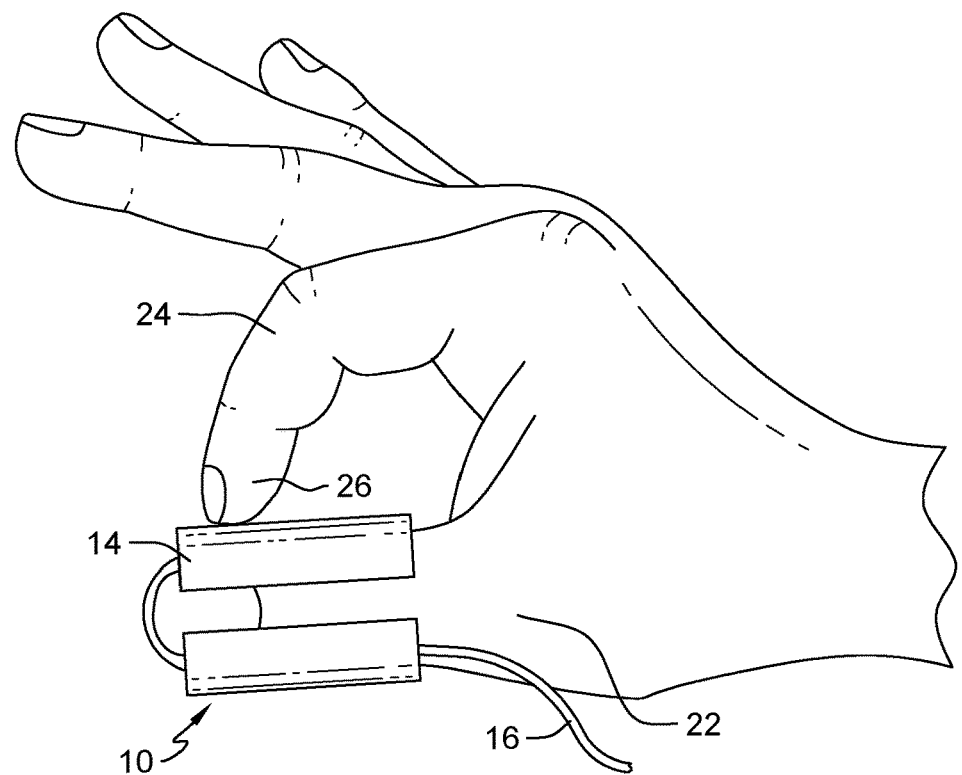
FIG. 2 is an illustration of the fingerprint recognition sensor of FIG. 1 on the right hand thumb of a user.

Referring now to FIG. 2, the fingerprint recognition sensor 10 has been placed on the thumb 22 of the right hand of a user. In operation, the user touches a fingertip to the outer surface 14 of the fingerprint recognition sensor 10 to cause the fingerprint recognition sensor 10 to image and read the fingerprint of the user's finger. The touching of the fingertip may be, for example, by pinching the fingertip to the thumb. In FIG. 2, it is the fingertip 26 of index finger 24 that touches the outer surface 14. The fingerprint recognition sensor 10 images, verifies the fingerprint from the user's stored fingerprint and reads the fingerprint from fingertip 26 and then looks up an action that is to occur corresponding to the fingerprint from fingertip 26.

It should be understood that all of the outer surface 14 of the fingerprint recognition sensor 10 may be enabled to read fingerprints. In that embodiment, the fingertip 26 touching any part of the outer surface 14 may be sufficient to read the fingerprint from fingertip 26. Alternatively, if only a portion of the outer surface 14 of the fingerprint recognition sensor 10 is enabled to read fingerprints, then fingertip 26 should touch that portion of the outer surface 14 in order for the fingerprint of fingertip 26 to be read.

Referring to FIG. 4, there is illustrated a table of actions that may occur when a fingertip from the right hand of the user is imaged and read by the fingerprint recognition sensor 10. Each fingertip may initiate a separate action. For example, the combination of the fingerprint of the index finger in contact with the fingerprint recognition sensor 10 will initiate an action to display an "a" while the combination of the fingerprint of the middle finger in contact with the fingerprint recognition sensor 10 will initiate an action to display a "b". The fingerprints of the ring finger and pinky finger will initiate actions to display a "c" and a "d", respectively. It is also within the scope of the exemplary embodiments for two fingertips to make contact with the fingerprint recognition sensor 10 to result in another option, in this case the combination of the fingertips of the ring finger and middle finger displaying an "e".

Figure 3:
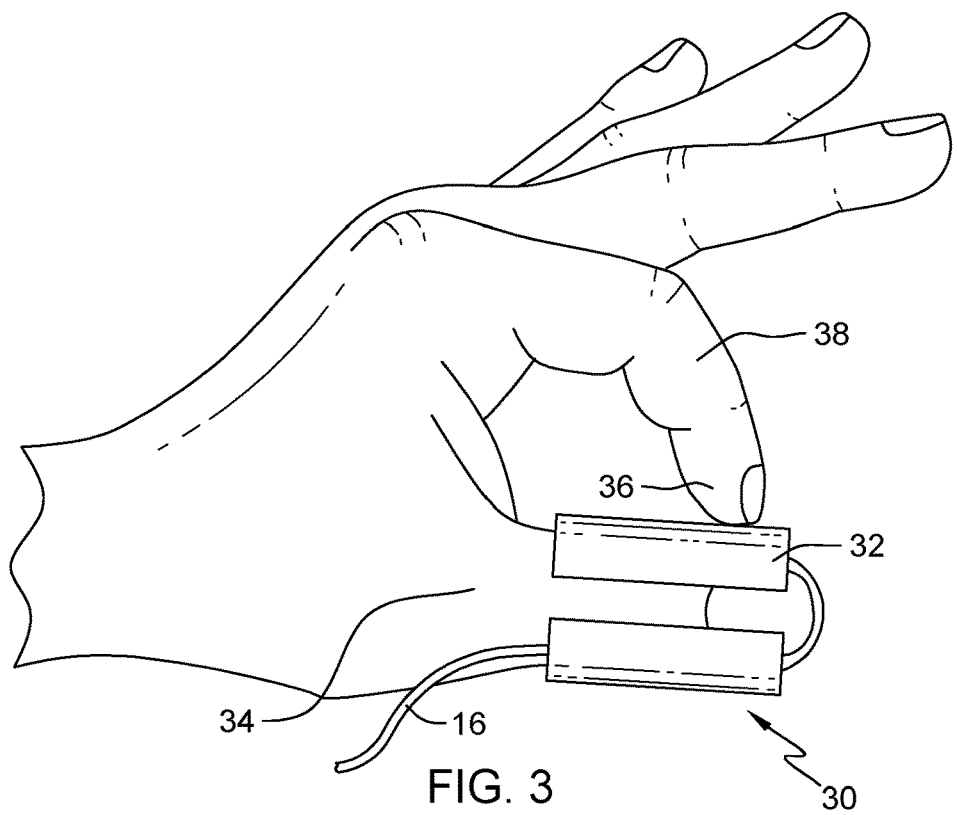
FIG. 3 is an illustration of the fingerprint recognition sensor of FIG. 1 on the left hand thumb of a user.

Referring now to FIG. 3, a second fingerprint recognition sensor 30 has been placed on the thumb 34 of the left hand of a user. In operation, the user touches a fingertip to the outer surface 32 of the second fingerprint recognition sensor 30 to cause the second fingerprint recognition sensor 30 to read the fingerprint of the user's finger. In FIG. 3, it is the fingertip 36 of index finger 38 that touches the outer surface 32. The second fingerprint recognition sensor 30 images and reads the fingerprint from fingertip 36, verifies the fingerprint from the user's stored fingerprint and then looks up an action that is to occur corresponding to the fingerprint from fingertip 36.

Referring to FIG. 5, there is illustrated a table of actions that may occur when a fingertip from the left hand of the user is imaged and read by the second fingerprint recognition sensor 30. Each fingertip may initiate a separate action. For example, the combination of the fingerprint of the index finger in contact with the second fingerprint recognition sensor 30 will initiate an action to display an "f" while the combination of the fingerprint of the middle finger in contact with the second fingerprint recognition sensor 30 will initiate an action to display a "g". The fingerprints of the ring finger and pinky finger will initiate actions to display an "h" and an "i", respectively. It is also within the scope of the exemplary embodiments for two fingertips to make contact with the second fingerprint recognition sensor 30 to result in another option, in this case the combination of the fingertips of the ring finger and middle finger displaying a "j".

In the above descriptions of triggering an action by touching a finger to the fingerprint recognition sensor 10 and the second recognition sensor 30, it is preferred that each finger correlates to the initiation of a different action. While the actions initiated are the display of letters, the actions may be to display numbers, open folders, close folders, start a process, end a process, just to give a few examples.

Further, the actions initiated by touching a finger to the fingerprint recognition sensor 10 and the second recognition sensor 30 have been described as independent thus far. That is, if the index finger of the right hand touched the fingerprint recognition sensor 10 and, more or less simultaneously, the index finger of the left hand touched the second fingerprint recognition 30, the letters "a" and "f" would be displayed, just as if the user was using a conventional keyboard.

It should also be understood that in the example illustrated in FIGS. 4 and 5, the actions may be reversed so that the left hand may initiate the letters "a" to "e" and the right hand may initiate the letters "f" to "j".

However, it is within the scope of the exemplary embodiments for the operation of the fingerprint recognition sensor 10 and the second recognition sensor 30 to be dependent so as to be able to initiate a greater variety of actions. According to this exemplary embodiment, fingertips of the right hand touching the fingerprint recognition sensor 10 would result in the initiated actions illustrated in FIG. 4 while, separately, fingertips of the left hand touching the second recognition sensor 30 would result in the initiated actions illustrated in FIG. 5.

FIG. 6 is a table of actions that may be initiated by combining fingertips of the right hand touching the fingerprint recognition sensor 10 while simultaneously fingertips of the left hand touching the second recognition sensor 30. For example, the index fingertip of the right hand touching the fingerprint recognition sensor 10 while simultaneously the index fingertip of the left hand touching the second recognition sensor 30 would result in the display of the letter "k". As another example, the middle fingertip of the right hand touching the fingerprint recognition sensor 10 while simultaneously the ring fingertip of the left hand touching the second recognition sensor 30 would result in the display of the letter "r". By having the dependence of the fingerprint recognition sensor 10 and the second fingerprint recognition sensor 30, additional letters "k" though "z" may be displayed as well as actions such as "space", "delete", "backspace" and "home" may be initiated. Again, these illustrated actions in FIGS. 4 to 6 are only for the purpose of illustration and not limitation.

An exemplary embodiment is a method of inputting an action to a computer device using a fingerprint recognition sensor. The fingerprint recognition sensor may be placed on one or both thumbs of a user. The fingerprint sensor has an outer surface to read a fingerprint of a user's finger placed in contact with the fingerprint recognition sensor.

Figure 7:
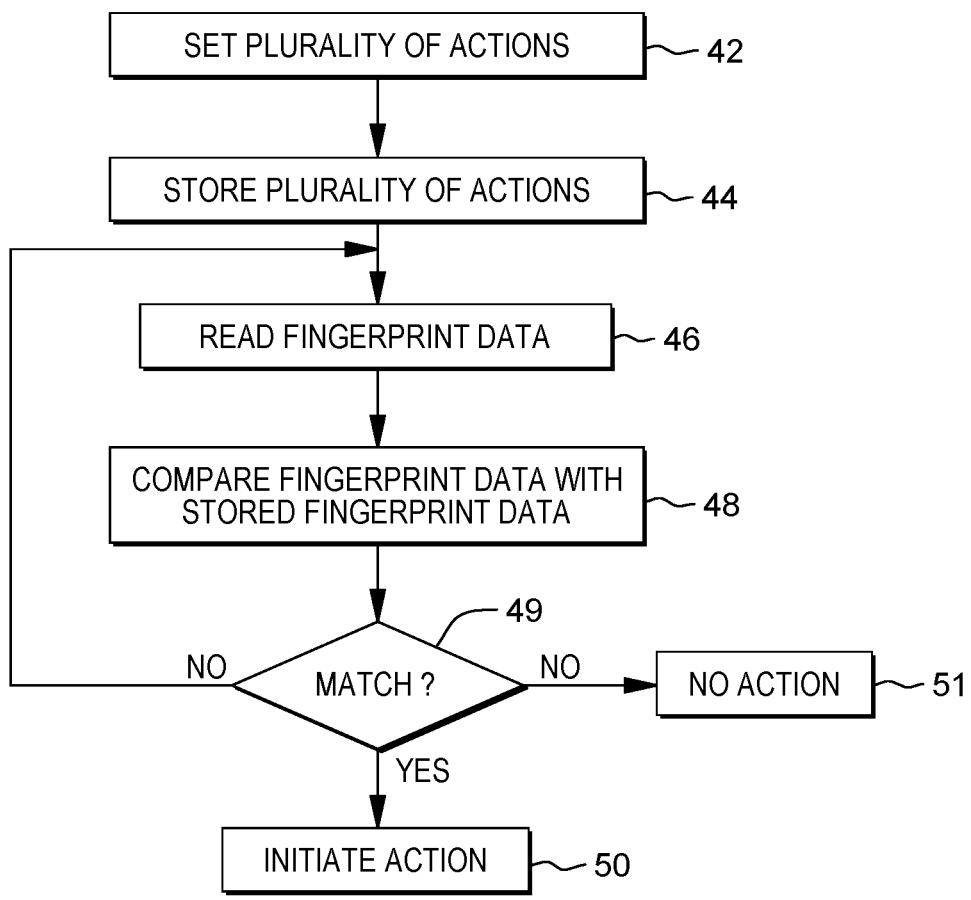
FIG. 7 is a flow chart of an exemplary method using the fingerprint recognition sensors of FIGS. 2 and 3.

The method is described in more detail with reference to FIG. 7. A plurality of actions corresponding to fingerprint data from a user's fingerprint patterns are set, box 42.

The plurality of actions corresponding to the fingerprint data are stored in the computer device, box 44.

Responsive to the user's finger placed in contact with the fingerprint recognition sensor, fingerprint data is read by the fingerprint recognition sensor corresponding to the user's fingerprint patterns from a first finger placed in contact with the fingerprint recognition sensor, box 46.

The fingerprint pattern from the first finger is compared with the user's fingerprint data stored in the computer device, box 48.

Responsive to a match, box 49, between the fingerprint pattern from the first finger and the user's fingerprint data stored in the computer device, the action stored in the computer device corresponding to the first finger placed in contact with the fingerprint recognition sensor is initiated, box 50.

If there is no match, box 49, no action is taken, box 51. Alternatively, the user may try placing the finger in contact with the fingerprint recognition sensor again to try initiating an action.

Figure 8:
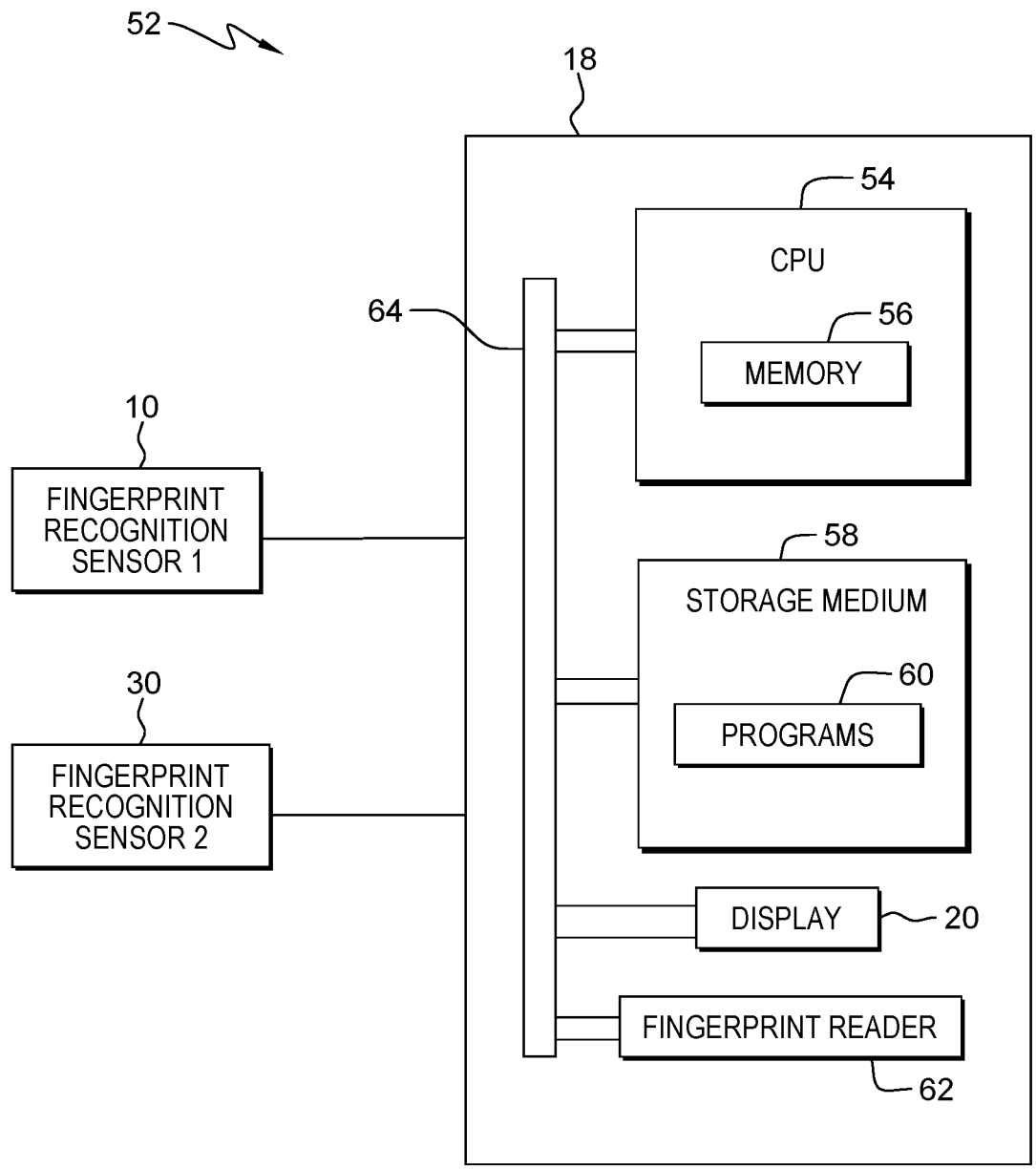
FIG. 8 is an illustration of an exemplary system for recognizing fingerprints and fingerprint combinations.

Referring now to FIG. 8, there is an illustration of an exemplary system 52 for recognizing fingerprints and fingerprint combinations. The system 52 includes the computing device 18 of FIG. 1 which may have a processor 54 (central processing unit (CPU)), memory 56 and nontransitory storage medium 58. Included within the nontransitory storage medium 58 may be various programs 60, one program of which may be a fingerprint reading and processing program.

Further included within computer device 18 may be a display 18, also shown in FIG. 1. The components within computer device 18 may be connected by a bus 64.

It should be understood that computer device 18 may contain other components but such other components are not germane to the present exemplary embodiments.

The system 52 may include the fingerprint recognition sensor 10 and the fingerprint recognition sensor 30 previously shown in FIGS. 1 to 3. Fingerprints read by one or both of the fingerprint recognition sensors 10, 30 may be provided to fingerprint reader 62 in computer device 18. In turn, the fingerprint reading and processing program within nontransitory storage medium 58 may process the fingerprints from fingerprint reader 62 and compare the read fingerprints to previously stored fingerprints. If there is a match between the read fingerprints and the stored fingerprints, CPU 54 may initiate an action. One action may be to display, for example, a letter or number on display 20.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A method of inputting an action to a computer device comprising:
   placing a fingerprint recognition sensor on a thumb of a first hand of a user, the fingerprint sensor having an outer surface to read a fingerprint of a user's finger placed in contact with the fingerprint recognition sensor, the fingerprint recognition sensor having an inner surface that does not read a fingerprint of the user's thumb;
   setting a plurality of actions corresponding to fingerprint data from a user's fingerprint patterns;
   storing the plurality of actions corresponding to the fingerprint data in the computer device;
   placing a first finger of the first hand of the user in contact with the fingerprint recognition sensor;
   reading fingerprint data by the fingerprint recognition sensor corresponding to the user's fingerprint patterns from the first finger of the first hand placed in contact with the fingerprint recognition sensor;
   comparing the fingerprint pattern from the first finger of the first hand with the user's fingerprint data stored in the computer device;
   responsive to a match between the fingerprint pattern from the first finger of the first hand and the user's fingerprint data stored in the computer device, initiating the action stored in the computer device corresponding to the first finger of the first hand placed in contact with the fingerprint recognition sensor;
   placing another finger of the first hand of the user in contact with the fingerprint recognition sensor;
   reading fingerprint data by the fingerprint recognition sensor corresponding to the user's fingerprint patterns from the another finger of the first hand placed in contact with the fingerprint recognition sensor;
   comparing the fingerprint pattern from the another finger of the first hand with the user's fingerprint data stored in the computer device;
   responsive to a match between the fingerprint pattern from the another finger of the first hand and the user's fingerprint data stored in the computer device, initiating the action stored in the computer device corresponding to the another finger of the first hand placed in contact with the fingerprint recognition sensor; and
   repeating placing another finger, reading fingerprint data by the fingerprint recognition sensor corresponding to the user's fingerprint patterns from the another finger, comparing the fingerprint pattern from the another finger and initiating the action stored in the computer device corresponding to the another finger for additional fingers of the first hand placed in contact with the fingerprint recognition sensor.

2. The method of claim 1 further comprising displaying the action on a display of the computer device.

3. The method of claim 1 further comprising:
   placing a second fingerprint recognition sensor on a thumb of a second hand of the user, the second fingerprint sensor having an outer surface to read a fingerprint of the user's finger placed in contact with the second fingerprint recognition sensor;
   placing a first finger of the user's second hand in contact with the second fingerprint recognition sensor;
   reading fingerprint data by the second fingerprint recognition sensor corresponding to the user's fingerprint patterns from the first finger of the second hand placed in contact with the second fingerprint recognition sensor;
   comparing the fingerprint pattern from the first finger of the second hand with the user's fingerprint data stored in the computer device;
   responsive to a match between the fingerprint pattern from the first finger of the second hand and the user's fingerprint data stored in the computer device, initiating the action stored in the computer device corresponding to the first finger of the second hand placed in contact with the second fingerprint recognition sensor.

4. The method of claim 3 further comprising displaying the action on a display of the computer device.

5. The method of claim 3 further comprising:
   placing another second finger of the user's second hand in contact with the second fingerprint recognition sensor;
   reading fingerprint data by the second fingerprint recognition sensor corresponding to the user's fingerprint patterns from the another finger of the second hand placed in contact with the second fingerprint recognition sensor;
   comparing the fingerprint pattern from the another finger of the second hand with the user's fingerprint data stored in the computer device;
   responsive to a match between the fingerprint pattern from the another finger of the second hand and the user's fingerprint data stored in the computer device, initiating the action stored in the computer device corresponding to the another finger of the second hand placed in contact with the second fingerprint recognition sensor; and
   repeating placing another finger, reading fingerprint data by the second fingerprint recognition sensor corresponding to the user's fingerprint patterns from the another finger, comparing the fingerprint pattern from the another finger and initiating the action stored in the computer device corresponding to the another finger for additional fingers placed in contact with the second fingerprint recognition sensor.

6. The method of claim 3 further comprising:
   wherein the steps of placing to the user's first finger of the first hand in contact with the fingerprint recognition sensor and the first finger of the user's second hand in contact with the second fingerprint recognition sensor occur simultaneously;
   reading fingerprint data by the fingerprint recognition sensor and the second fingerprint recognition sensor corresponding to the user's fingerprint patterns from the first finger of the first hand placed in contact with the fingerprint recognition sensor and the first finger of the second hand placed in contact with the second fingerprint recognition sensor;
   comparing the fingerprint pattern from the first finger of the first hand and the first finger of the second hand with the user's fingerprint data stored in the computer device;
   responsive to matches between the fingerprint patterns from the first finger of the first hand placed in contact with the fingerprint recognition sensor and the first finger of the second hand placed in contact with the second fingerprint recognition sensor and the user's fingerprint data stored in the computer device, initiating the action stored in the computer device corresponding to simultaneous contact of the first finger of the first hand placed in contact with the fingerprint recognition sensor and the first finger of the second hand placed in contact with the second fingerprint recognition sensor.

7. The method of claim 1 wherein the user's fingerprint patterns comprise entire fingerprint pattern of arch, loop, and whorl ridges.

8. The method of claim 1 wherein the user's fingerprint patterns comprise only major minutiae features of fingerprint ridges including ridge ending, bifurcation, and short ridge minutiae features.

9. A computer program product for inputting an action to a computer device using a fingerprint recognition sensor placed on a thumb of a first hand of a user, the fingerprint sensor having an outer surface to read a fingerprint of a user's finger placed in contact with the fingerprint recognition sensor, the computer program product comprising a nontransitory computer readable storage medium having program instructions embodied therewith, the program instructions executable by a computer processor to cause the computer processor to cause the computer processor to perform a method comprising:
  placing a fingerprint recognition sensor on a thumb of a first hand of a user, the fingerprint sensor having an outer surface to read a fingerprint of a user's finger placed in contact with the fingerprint recognition sensor the fingerprint recognition sensor having an inner surface that does not read a fingerprint of the user's thumb;
  setting a plurality of actions corresponding to fingerprint data from a user's fingerprint patterns;
  storing the plurality of actions corresponding to the fingerprint data in the computer device;
  placing to a first finger of the first hand of the user in contact with the fingerprint recognition sensor;
  reading fingerprint data by the fingerprint recognition sensor corresponding to the user's fingerprint patterns from the first finger of the first hand placed in contact with the fingerprint recognition sensor;
  comparing the fingerprint pattern from the first finger of the first hand with the user's fingerprint data stored in the computer device;
  responsive to a match between the fingerprint pattern from the first finger of the first hand and the user's fingerprint data stored in the computer device, initiating the action stored in the computer device corresponding to the first finger of the first hand placed in contact with the fingerprint recognition sensor;
  placing another finger of the first hand of the user in contact with the fingerprint recognition sensor;
  reading fingerprint data by the fingerprint recognition sensor corresponding to the user's fingerprint patterns from the another finger of the first hand placed in contact with the fingerprint recognition sensor;
  comparing the fingerprint pattern from the another finger of the first hand with the user's fingerprint data stored in the computer device;
  responsive to a match between the fingerprint pattern from the another finger of the first hand and the user's fingerprint data stored in the computer device, initiating the action stored in the computer device corresponding to the another finger of the first hand placed in contact with the fingerprint recognition sensor; and
  repeating placing another finger, reading fingerprint data by the fingerprint recognition sensor corresponding to the user's fingerprint patterns from the another finger, comparing the fingerprint pattern from the another finger and initiating the action stored in the computer device corresponding to the another finger for additional fingers of the first hand placed in contact with the fingerprint recognition sensor.

10. The computer program product of claim 9 further comprising displaying the action on a display of the computer device.

11. The computer program product of claim 9 further comprising:
  placing a second fingerprint recognition sensor on a thumb of a second hand of the user, the second fingerprint sensor having an outer surface to read a fingerprint of the user's finger placed in contact with the second fingerprint recognition sensor;
  placing to a first finger of the user's second hand placed in contact with the second fingerprint recognition sensor;
  reading fingerprint data by the second fingerprint recognition sensor corresponding to the user's fingerprint patterns from the first finger of the second hand placed in contact with the second fingerprint recognition sensor;
  comparing the fingerprint pattern from the first finger of the second hand with the user's fingerprint data stored in the computer device;
  responsive to a match between the fingerprint pattern from the first finger of the second hand and the user's fingerprint data stored in the computer device, initiating the action stored in the computer device corresponding to the first finger of the second hand placed in contact with the second fingerprint recognition sensor.

12. The computer program product of claim 11 further comprising displaying the action on a display of the computer device.

13. The computer program product of claim 11 further comprising:
  placing another finger of the user's second hand in contact with the second fingerprint recognition sensor;
  reading fingerprint data by the second fingerprint recognition sensor corresponding to the user's fingerprint patterns from the another finger of the second hand placed in contact with the second fingerprint recognition sensor;
  comparing the fingerprint pattern from the another finger of the second hand with the user's fingerprint data stored in the computer device;
  responsive to a match between the fingerprint pattern from the another finger of the second hand and the user's fingerprint data stored in the computer device, initiating the action stored in the computer device corresponding to the another finger of the second hand placed in contact with the second fingerprint recognition sensor; and
  repeating placing another finger, reading fingerprint data by the second fingerprint recognition sensor corresponding to the user's fingerprint patterns from the another finger, comparing the fingerprint pattern from the another finger and initiating the action stored in the computer device corresponding to the another finger for additional fingers placed in contact with the second fingerprint recognition sensor.

14. The computer program product of claim 11 further comprising:
  wherein the steps of placing the user's first finger of the first hand in contact with the fingerprint recognition sensor and the first finger of the user's second hand in contact with the second fingerprint recognition sensor occur simultaneously;
  reading fingerprint data by the fingerprint recognition sensor and the second fingerprint recognition sensor corresponding to the user's fingerprint patterns from the first finger of the first hand placed in contact with the fingerprint recognition sensor and the first finger of the second hand placed in contact with the second fingerprint recognition sensor;

comparing the fingerprint pattern from the first finger of the first hand and the first finger of the second hand with the user's fingerprint data stored in the computer device;

responsive to matches between the fingerprint patterns from the first finger of the first hand placed in contact with the fingerprint recognition sensor and the first finger of the second hand placed in contact with the second fingerprint recognition sensor and the user's fingerprint data stored in the computer device, initiating the action stored in the computer device corresponding to simultaneous contact of the first finger of the first hand placed in contact with the fingerprint recognition sensor and the first finger of the second hand placed in contact with the second fingerprint recognition sensor.

15. The computer program product of claim 9 wherein the user's fingerprint patterns comprise entire fingerprint pattern of arch, loop, and whorl ridges.

16. The computer program product of claim 9 wherein the user's fingerprint patterns comprise only major minutiae features of fingerprint ridges including ridge ending, bifurcation, and short ridge minutiae features.

17. A system for recognizing fingerprints and fingerprint combinations as inputs to a computer device comprising:

a fingerprint recognition sensor placed on a thumb of a first hand of a user, the fingerprint sensor having an outer surface to read a fingerprint of a user's finger placed in contact with the fingerprint recognition sensor, the fingerprint recognition sensor having an inner surface that does not read a fingerprint of the user's thumb, the remaining fingers of the first hand of the user being devoid of any fingerprint recognition sensor;

a nontransitory storage medium that stores instructions;

a processor that executes the instructions to:

set a plurality of actions corresponding to fingerprint data from a user's fingerprint patterns;

store the plurality of actions corresponding to the fingerprint data in the computer device;

place a first finger of the first hand of the user in contact with the fingerprint recognition sensor;

read fingerprint data by the fingerprint recognition sensor corresponding to the user's fingerprint patterns from the first finger of the first hand placed in contact with the fingerprint recognition sensor;

compare the fingerprint pattern from the first finger of the first hand with the user's fingerprint data stored in the computer device;

responsive to a match between the fingerprint pattern from the first finger of the first hand and the user's fingerprint data stored in the computer device, initiate the action stored in the computer device corresponding to the first finger of the first hand placed in contact with the fingerprint recognition sensor;

place another finger of the first hand of the user in contact with the fingerprint recognition sensor;

read fingerprint data by the fingerprint recognition sensor corresponding to the user's fingerprint patterns from the another finger of the first hand placed in contact with the fingerprint recognition sensor;

compare the fingerprint pattern from the another finger of the first hand with the user's fingerprint data stored in the computer device;

responsive to a match between the fingerprint pattern from the another finger of the first hand and the user's fingerprint data stored in the computer device, initiate the action stored in the computer device corresponding to the another finger of the first hand placed in contact with the fingerprint recognition sensor; and repeat place another finger, read fingerprint data by the fingerprint recognition sensor corresponding to the user's fingerprint patterns from the another finger, compare the fingerprint pattern from the another finger and initiate the action stored in the computer device corresponding to the another finger for additional fingers of the first hand placed in contact with the fingerprint recognition sensor.

18. The system of claim 17 further comprising a display on the computer device to display the action.

* * * * *